United States Patent [19]

Valbona

[11] 4,316,584
[45] Feb. 23, 1982

[54] LIQUID DISPENSER FOR FOOD PROCESSOR

[75] Inventor: Bruno M. Valbona, Hartford County, Conn.

[73] Assignee: Dynamics Corporation of America, Greenwich, Conn.

[21] Appl. No.: 29,132

[22] Filed: Apr. 12, 1979

[51] Int. Cl.³ ............................................. B02C 18/22
[52] U.S. Cl. .................................. 241/38; 241/282.1; 222/185; 366/150
[58] Field of Search .................. 366/150; 241/38, 92, 241/199.12, 282.1, 282; 222/185; 141/324; 81/3 R; 99/306

[56] References Cited

U.S. PATENT DOCUMENTS

| | | |
|---|---|---|
| 661,207 | 11/1900 | Carter . |
| 2,169,323 | 8/1939 | Martinet ............................... 241/92 |
| 2,266,186 | 12/1941 | Fischer . |
| 2,444,753 | 7/1948 | Smith . |
| 2,650,741 | 9/1953 | Van Guilder . |
| 3,080,810 | 3/1963 | Saint ...................................... 99/306 |
| 4,095,751 | 6/1978 | Artin ..................................... 241/92 |
| 4,113,188 | 9/1978 | Belinkoff ........................... 241/282.1 |
| 4,213,570 | 7/1980 | Jones .................................... 241/38 |

Primary Examiner—Robert W. Jenkins
Attorney, Agent, or Firm—Sixbey, Friedman & Leedom

[57] ABSTRACT

A method and apparatus for making sauce and salad dressings in which vegetable oil is trickled into a mixer at a predetermined limited rate for complete dispersion in which perfected mixing and suspension is provided by gravity accelerated free flow of oil in a thinning fine stream, or droplets, a substantial distance undisturbed by agitated air and the flow is repeatedly comminuted by high speed cutters or blades rotating edgewise at 1800 R.P.M. in a mixing operation which assures excellent suspension of the oil in a mixture which does not separate.

7 Claims, 5 Drawing Figures

LIQUID DISPENSER FOR FOOD PROCESSOR

BACKGROUND OF THE INVENTION

The emulsification of oil in a home kitchen heretofore is not easy, nor stable, and has required a great deal of time, effort and expertise. In fact, the making of a sauce and salad dressing in a home kitchen is quite discouraging, generally from a culinary results viewpoint, and it is difficult and somewhat dangerous for housewives to try to employ a household kitchen mixer to provide the necessary treatment of a salad oil that would assure against the separation of oil even after having been mixed a comparatively long period of time. Moreover, the time and carefulness required are not readily available, nor taken by a housewife, to make good mayonnaise. Any desire for various or special flavors that might be in store stocked mayonnaise involves additional expense and independent containers for the different flavor-mixes must also be purchased and mixed.

The primary object of the invention is to enable a housewife to provide a cup or so of salad dressing with little effort and do it with recipe ingredients by merely assemblying a bowl and cutters, then measuring a cup of oil, cracking an egg and turning "on" and "off" a constant speed motor a couple of times, including adding the flavor or flavors desired, with a total time involvement of appreciably less than five minutes. A dressing with a selected flavor is produced everytime accurately, quickly and easily with the products storable without separation for long periods of time before or between uses.

Other objects relate to the simplicity and safety of handling cutters and equipment involved at high speed and energy levels by persons both skilled and unskilled mechanically along with the encouragement to use quick working equipment that is visually quite easily used and quickly cleanable after use either for repeated use immediately or storage.

SUMMARY

A measured supply of free flowing oil is supplied by gravity in a fine stream through a quiescent air space for elongation and stable gravity accelerated flow into a space where it is contacted alternately at vertically spaced points by two knives, each arcuately rotating at approximately 30 feet a second, with great air turmoil between and below the paths of the knives, to virtually vaporize the oil for mixing with the dressing ingredients.

IN THE DRAWINGS

DESCRIPTION OF THE INVENTION

Figure 1:
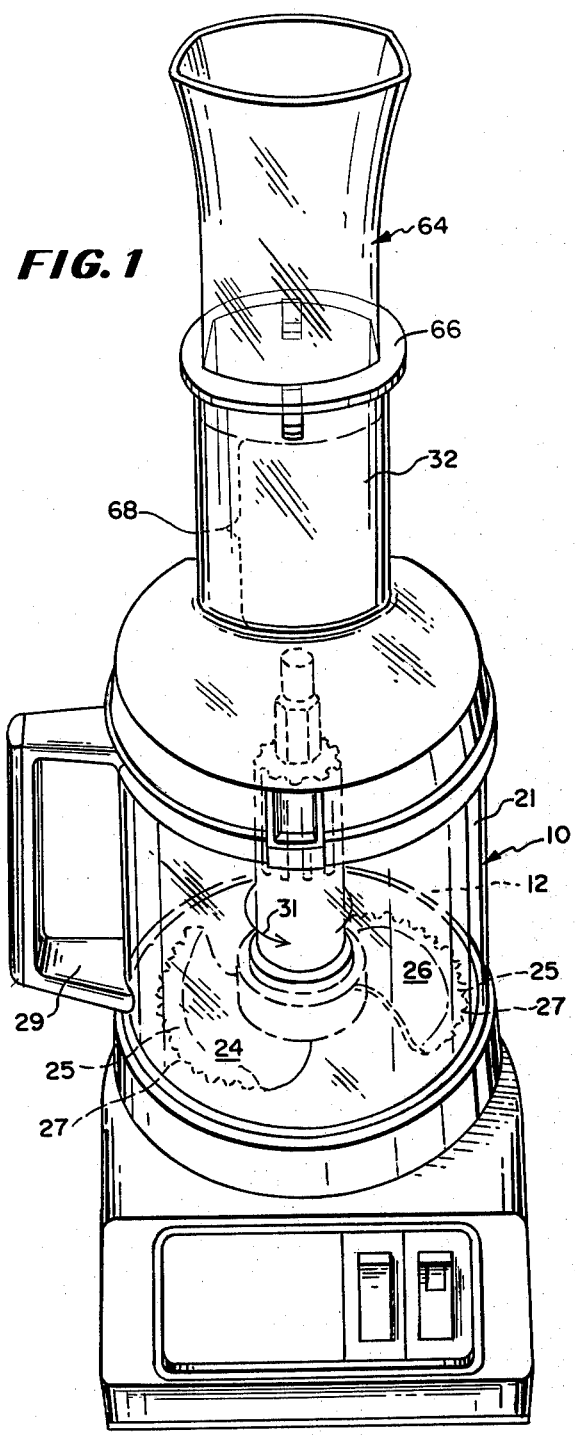
FIG. 1 is a perspective view of the apparatus illustrated in Application Ser. No. 952,381 assembled with a measuring, metering flow cup for supplying oil for mayonnaise.
Figure 2:
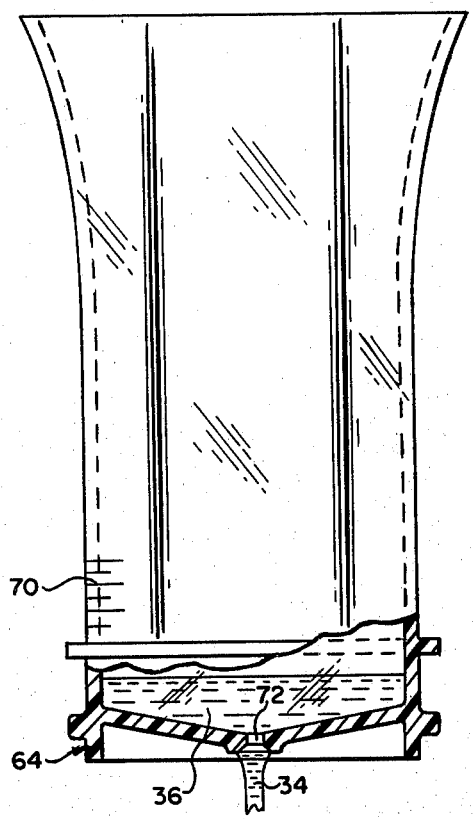
FIG. 2 is an enlarged, side elevational view, partly in section of the oil supply measuring cup used in FIG. 1.
Figure 3:
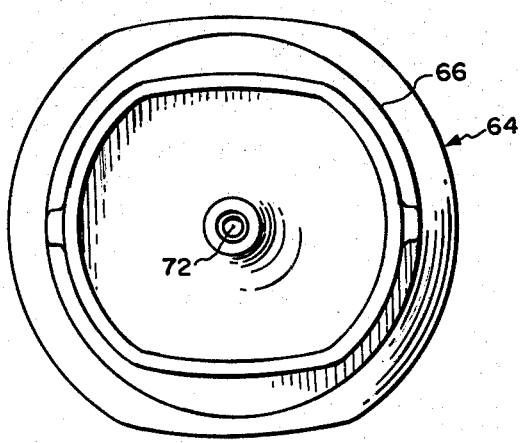
FIG. 3 is a view of the cup taken of the bottom thereof.
Figure 4:
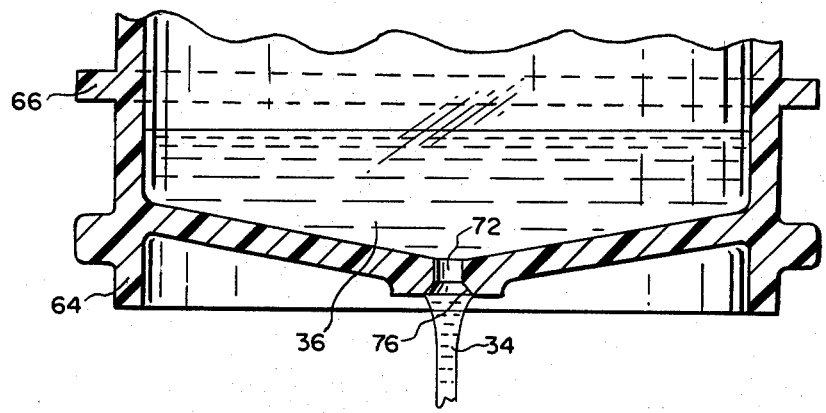
FIG. 4 is an enlarged vertical-sectional view of the bottom of the cup shown in FIG. 2.
Figure 5:
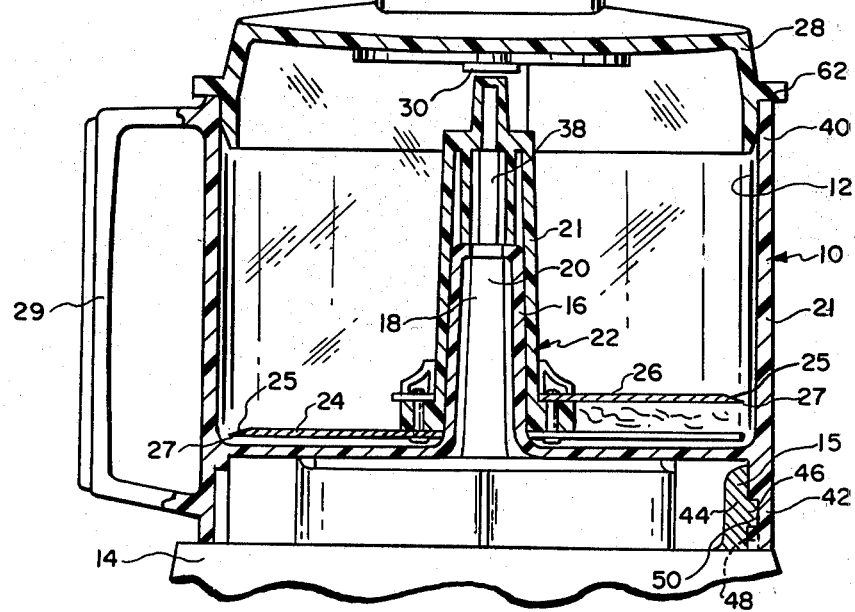
FIG. 5 is a vertical sectional view through the lid, bowl and the vertically spaced knives rotated in the bowl.

Referring now to the drawings in further detail, the invention is illustrated and will be described in connection with a quickly and easily assembled, food processing device usable for many recipes. It preferably includes a bowl 10 defining a flat bottomed cylindrical chamber 12 approximately six inches in diameter and four inches deep supported on a motor housing 14 by flange engagement at 15 and having a hollow central sleeve 16 supported concentrically upon a post 18 that houses a vertical drive shaft 20.

Viewed from above, the motor turns counterclockwise and drives the vertical shaft 20 journalled in a high tapered tubular housing portion 21 that is concentrically located on the top of the motor housing 14. The shaft 20 terminates upwardly in an exposed elongated hexagonally sectioned true-running clutch member 38 for receiving tools 22 telescoping thereon in drive aligned relation concentric with the circular wall 12 of the bowl 10. Accordingly interchangeable horizontally rotatable tools can be used singly or in tandem merely by placing and spacing them on the shaft.

In the making of mayonnaise or dressing, it is preferred to employ dual cutter blades 24 and 26 located near the flat bottom of the cylindrical chamber 12 where a stream 34 of oil 36 is downwardly accelerated by gravity for progressive comminution by the cutter blades at vertically spaced levels at a rate of sixty times a second including repeatedly impacting the mixture elements in the bowl continuously by the lower cutter having an upwardly inclined edge portion 25 trailing the serrated sinusoidal cutting edges 27 that lifts the elements severed and causes violent mixing.

Thus, the rotational speed of approximately 1800 R.P.M. provides 3600 cuts per minute, alternately high and low to prevent cavitation for processing small quantities as well as substantial quantities of dressings or mayonnaise with satisfactory results in much less time than that involved with conventional variable speed food mixers or whisks and, furthermore, requires much less clean up time.

The cover 28 received on the upper edge 62 of the bowl has an integrally formed vertical chute 32 located above the paths of the rotating blades 24 and 26. A measuring cup 64 designed for salad oil is removably supported by an integral flange 66 on the upper end of the chute 32 with the bottom of the cup 64 preferably located well above the level of the cover 28 to provide a wide open free fall space 68 of substantial height before entering the substantially large bowl space above the cutter blades 24 and 26 that are located next to the bottom of the bowl 10.

Thus, not only are the contents of the cup 64 clearly visible to the housewife but the cup can be quickly attached, filled to a predetermined level, according to the volume side-markings 70, and removed when finished for other food preparation to the Processor.

Furthermore, and advantageously, the oil metering opening arrangement 72 on the bottom of the cup is high enough in the feed chute 32 to provide initially a quiet air space below it for consistency and constancy of the oil flow which then enters into the large space of the bowl 10 where the action of the cutters 24 and 26 turbulate the air and assists the splash and distribution of the finely divided oil, along with any other ingredients present, as propelled by gravity and turbulence in its long, speedaccelerated fall.

In this connection, the metering of oil is determined by the size of the oil metering opening 72 which is approximately 0.102" of an inch and a vertically directed countersink 74 therebelow defines a downwardly diverging conical surface 76 having a 90° included angle. Preferably, the major diameter of the conical surface is approximately 0.188" and the flow is thin and substantially uniform regardless of the oil level in the cup. These dimensions provide for a contractive meniscus and along with this there exsists an oil particle cohesiveness or surface tension effect, which provides a continuous but thin stream of oil flowing downwardly. Then as the thin, even stream of oil accelerates downwardly under gravity it progressively thins out further in proportion to the height of the gravity accelerated fall. The upper quiet air environment assures this stretching and fast fall and the turbulency of the air over its lower length in the bowl 10 tends to stretch the thinning stream even further and break it. Preferably before or, as the breaks in the stream occur, the cutters themselves progressively sever the thinned elongated stream 3600 times a minute, most of which can be a further comminution of already severed increments.

All oils need not have the same viscosity and several parallel vertical conduits of smaller sizes as well as the shapes or sizes of the recessed cavities at the lower ends of the passages may be significant, provided and adjusted. Moreover, with plural vertical conduits of small sizes, any one or more of them can be selectively stoppered if thinner oils are commercially used thus providing variant flow value like adjustment.

It is also to be noted that a wetted meniscus at the passages 72 and countersink 74 with the mild vibration of the running mechanism provides a controlled dripping or flow as determined by the size or sizes of feed openings and diverging wall outlets. Vibration scintillates liquid flow that is uniform in relation to the menisucs forces, the taper and the size of feed openings. The taper angle is disposed vertically and for the constancy of gravity the outlet cavity diverges dwonwardly.

OPERATION

By way of an operational example, a cup of vegtable oil, with or without light olive oil in it, utilizing the two vertically spaced cutting knives 24 and 26 providing 3600 circular cuts per minute in the bowl, an egg and lemon juice is placed in the bowl and the processor is turned on to run for about ten seconds. The measuring cup 64 is slipped into place, and the oil poured in and allowed to trickle into the paths of the cutting edges. In about two minutes all the oil will have been added, the machine turned off, and the resulting mayonnaise mixture can be tasted. If further seasoning is added the cover is replaced for safety sake and the machine turned on for a couple of seconds to blend the seasoning. Thereafter the side of bowl and cutters can be scraped clean and then washed. In the process, the oil has been comminuted so finely that it will not leave suspension.

A sample recipe is as follows which aids in understanding the invention and the results attained thereby.

MAYONNAISE

Yield: 1½ cups

1 "extra-large" egg (room temperature)
2 tsp. fresh lemon juice
½ tsp. salt
½ tsp. dry mustard
¾ cup vegtable oil
¼ cup light olive oil 1. Place cutting knife into processor bowl. Place egg, lemon juice, salt and dry mustard into bowl.
2. Mix two types of oil in the pusher measuring cup for use in step 4.
3. Turn on processor. Allow it to run about 10 seconds.
4. While processor continues to run, place the Sauce and Salad Dressing Maker into feed tube. Pour the oil in the measuring cup into the Sauce and Salad Dressing Maker.
5. In about 2 minutes all the oil will have been added to the processor bowl. Turn off machine. Scrape down side of bowl. Taste mayonnaise and correct seasoning, if necessary by adding seasoning to the processor bowl. Run machine for about 2 seconds to blend in seasoning.

What is claimed is:

1. A fluid metering dispenser for use in combination with a food processor having a bowl means with a base wall and at least one sidewall extending from said base wall to form an open ended enclosure, rotatable blade means mounted within the confines of said enclosure and a removable cover means adapted to seat on the sidewall at the open end of said enclosure, said cover means including a top wall for extending across the open end of said enclosure, an inlet opening in said top wall and an open ended chute means extending annularly around said inlet opening and outwardly from said top wall away from the enclosure for a predetermined distance to form an enclosed inlet passage leading to said inlet opening, said fluid metering dispenser including a bottom wall having a fluid dispensing opening formed therein and a sidewall shaped to permit only partial insertion of said fluid metering dispenser into said inlet passage, said sidewall having an upper portion with a top open end remote from said bottom wall, said sidewall also having a lower portion with both an internal surface connected to said bottom wall to form a metering chamber which holds a supply of fluid for dispensing from said fluid dispensing opening and an external surface with a stop means for positioning said top open end of said upper portion at a predetermined distance from the open end of said chute means while simultaneously positioning said bottom wall near the open end of said chute means such that an air space of predetermined constant dimension is maintained between said fluid dispensing opening and said inlet opening in said top wall of said cover means to permit the free fall of fluid from said fluid dispensing opening along an unperturbed path to said inlet opening, said stop means having an outwardly extending surface which contacts said chute means after said fluid metering dispenser has been only partially inserted into said inlet passage and which subsequently prevents any further insertion of said fluid metering dispenser into said inlet passage.

2. The fluid metering dispenser of claim 1 wherein said bottom wall also has upper and lower surfaces which both taper angularly toward said fluid dispensing opening, said taper being in a direction away from said top open end of said upper portion.

3. The fluid metering dispenser of claim 1 wherein measuring indicia are provided upon said sidewall means between said stop means and the top open end of said metering chamber.

4. The fluid metering dispenser of claim 1 wherein said fluid dispensing opening is located substantially in the center of said bottom wall.

5. The fluid metering dispenser of claim 1 wherein said fluid dispensing opening is substantially 0.102 inches in diameter.

6. The fluid metering dispenser of claim 1 wherein said fluid dispensing opening includes a reduced neck section opening into said metering chamber and a diverging section terminating in an outlet opening of greater cross sectional area than the cross sectional area of said neck section, said diverging section tapering outwardly to said outlet opening from a juncture with said neck section.

7. The fluid metering dispenser of claim 6 wherein said diverging section is tapered in a manner such that opposed walls thereof form an angle of substantially ninety degrees, the diameter of said neck section being substantially 0.102 inches and the diameter of said outlet opening being substantially 0.188 inches.

* * * * *